(No Model.) 15 Sheets—Sheet 1.

E. A. FRANKLIN.
CARTRIDGE LOADING MACHINE.

No. 396,359. Patented Jan. 15, 1889.

WITNESSES:
C. M. Clarke.
W. B. Corwin.

INVENTOR,
Edward A. Franklin
by W. Bakewell & Sons
his Att'ys.

(No Model.) E. A. FRANKLIN. 15 Sheets—Sheet 3.
CARTRIDGE LOADING MACHINE.

No. 396,359. Patented Jan. 15, 1889.

WITNESSES:
O. M. Clarke
N. H. Corwin

INVENTOR,
Edward A. Franklin
by N. Bakewell & Sons
his Att'ys.

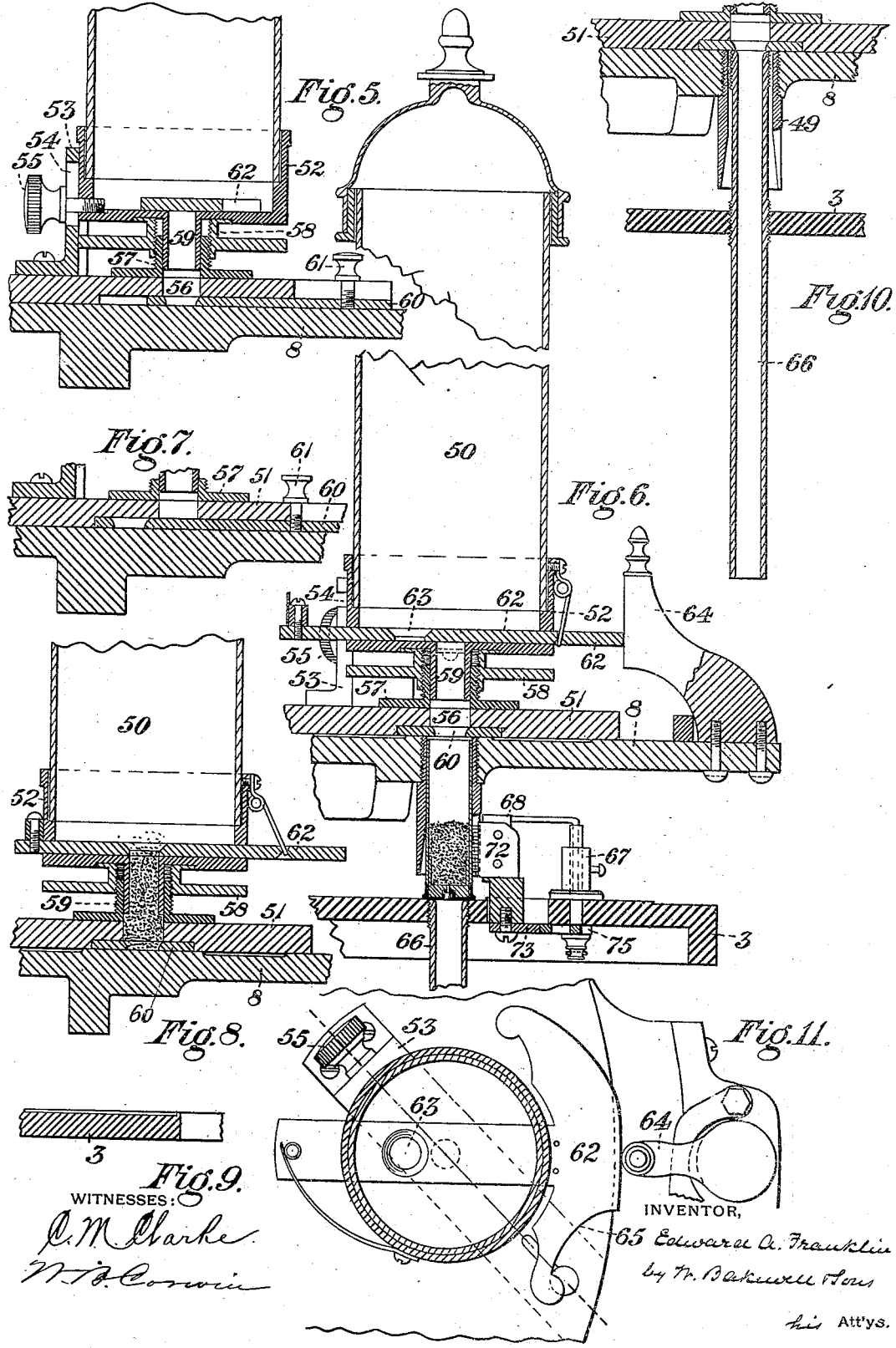

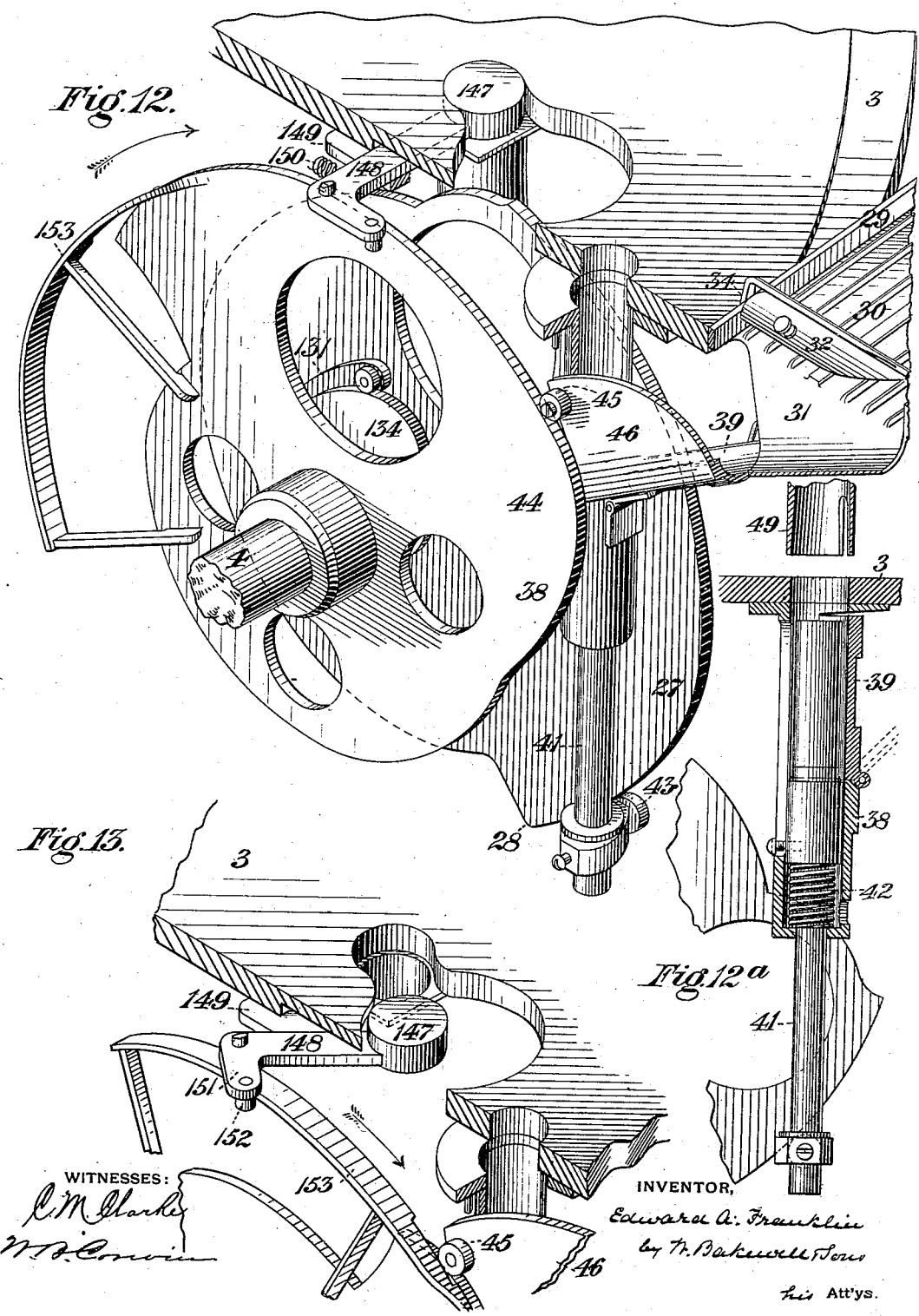

(No Model.) 15 Sheets—Sheet 6.
E. A. FRANKLIN.
CARTRIDGE LOADING MACHINE.
No. 396,359. Patented Jan. 15, 1889.
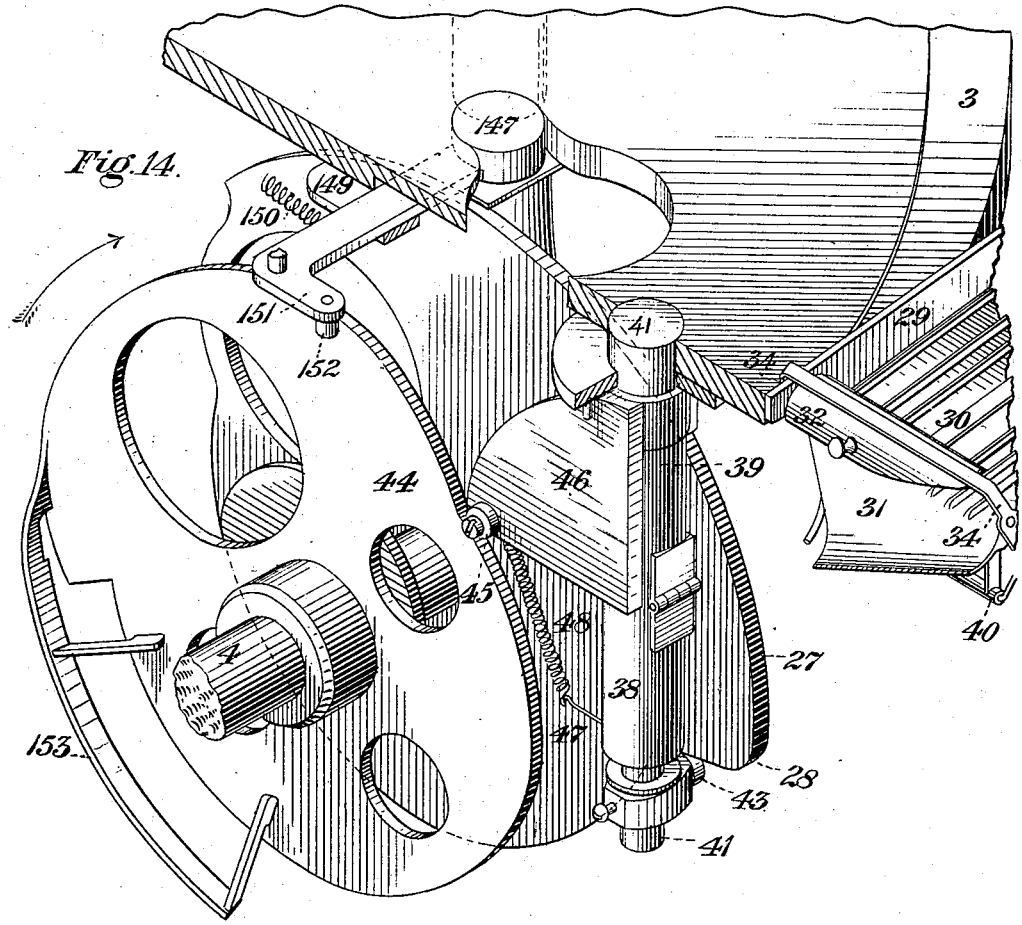
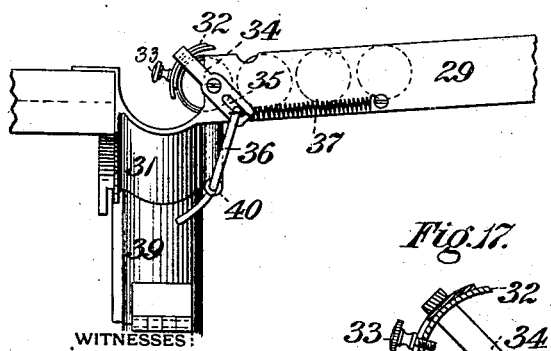
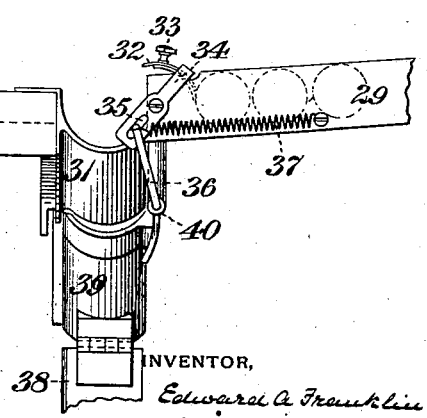

(No Model.) 15 Sheets—Sheet 7.
E. A. FRANKLIN.
CARTRIDGE LOADING MACHINE.
No. 396,359. Patented Jan. 15, 1889.
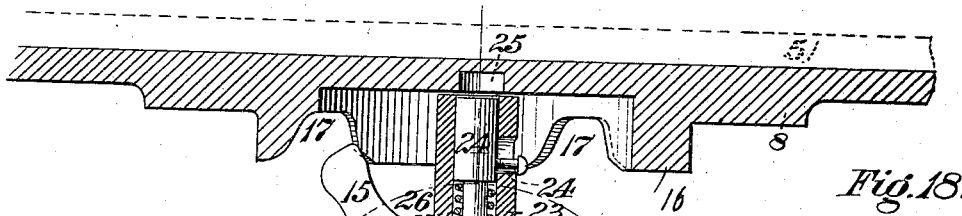
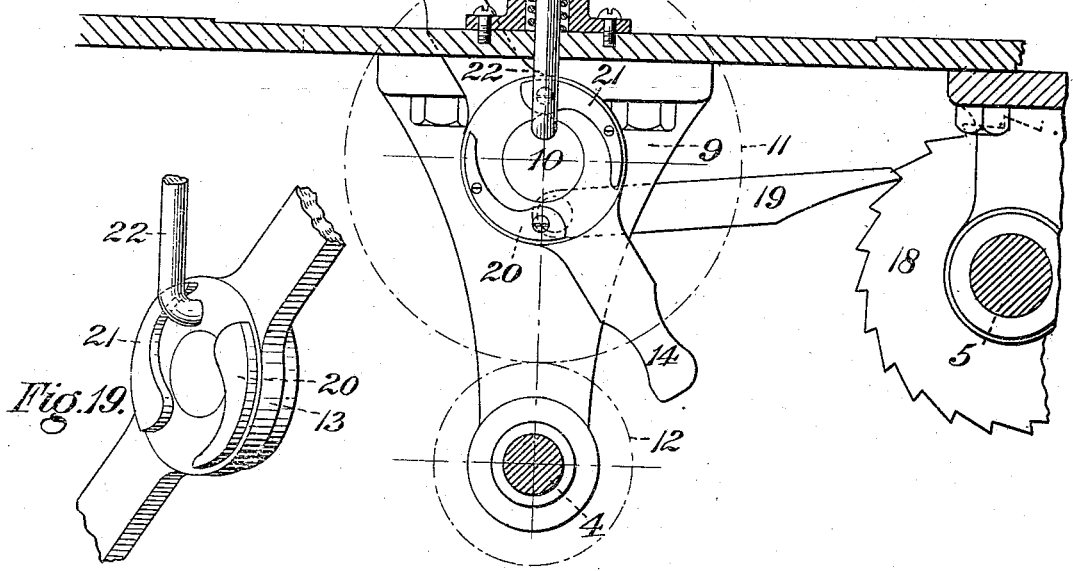
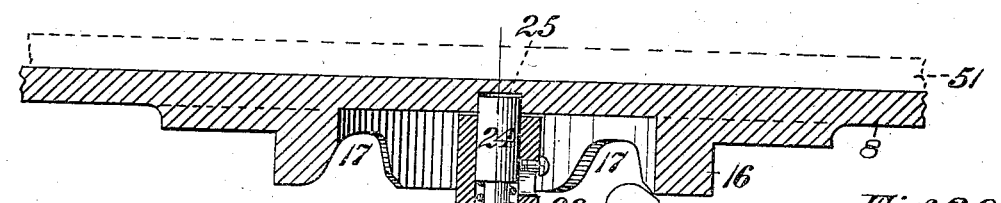
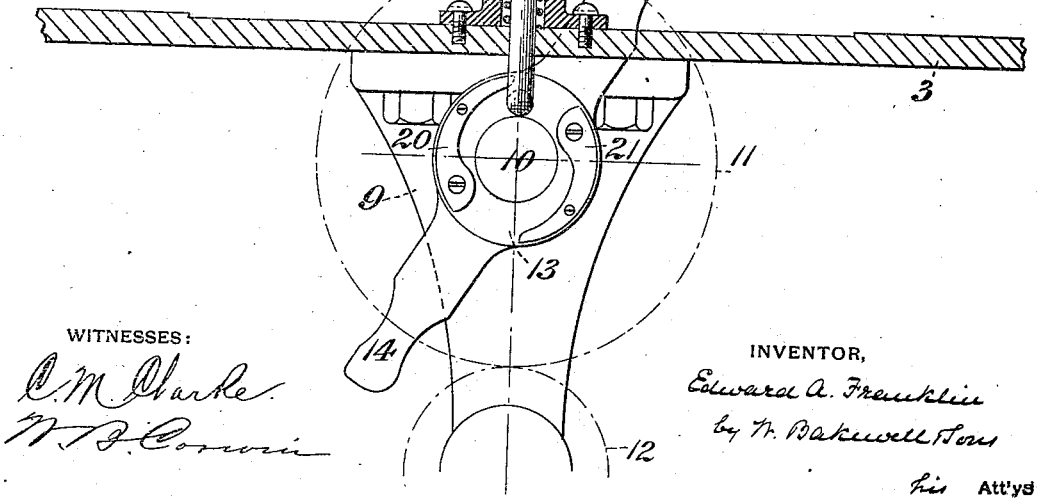
WITNESSES:
C. M. Clarke
W. B. Corwin
INVENTOR,
Edward A. Franklin
by W. Bakewell & Sons
his Att'ys.

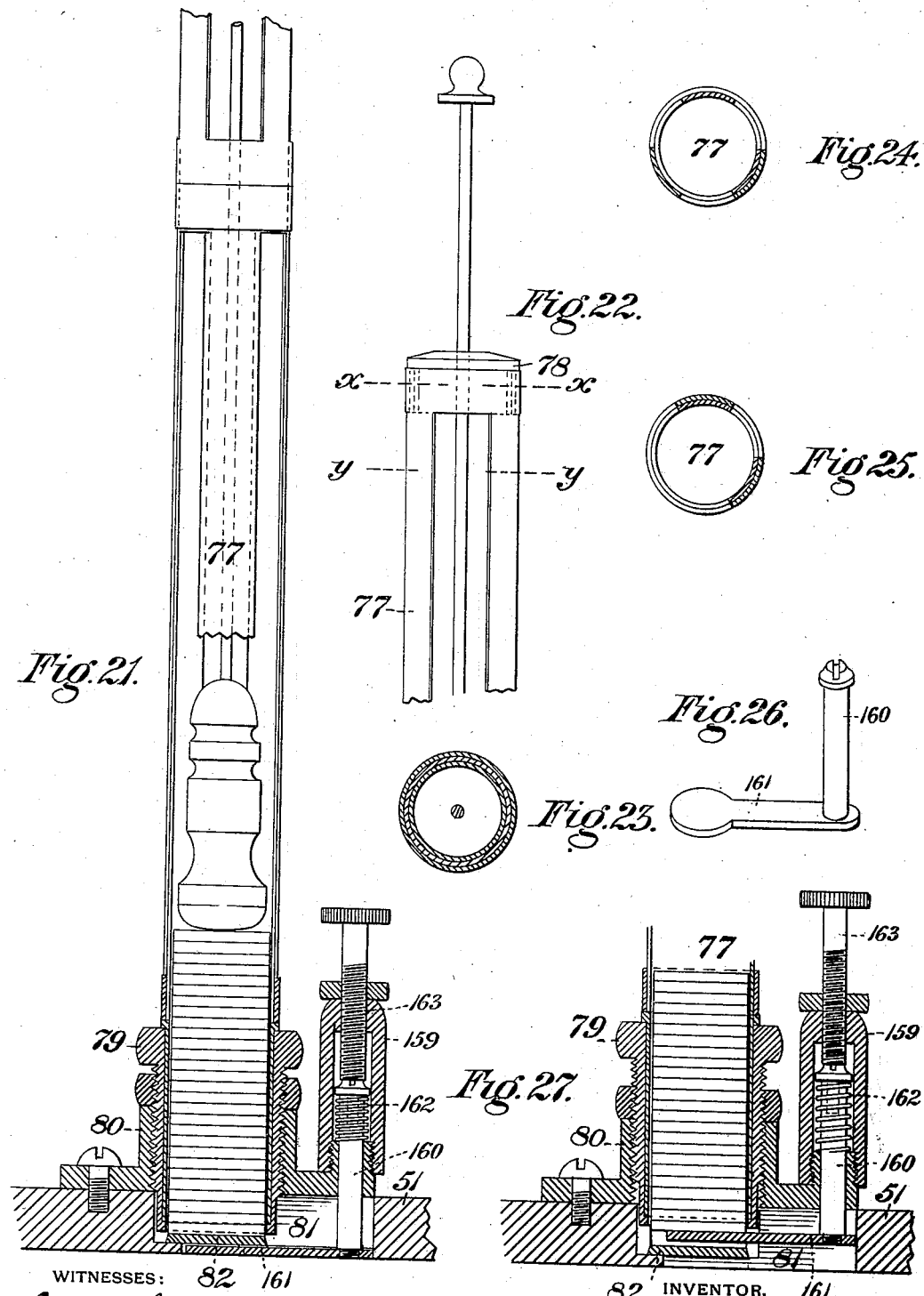

(No Model.) 15 Sheets—Sheet 9.
E. A. FRANKLIN.
CARTRIDGE LOADING MACHINE.
No. 396,359. Patented Jan. 15, 1889.
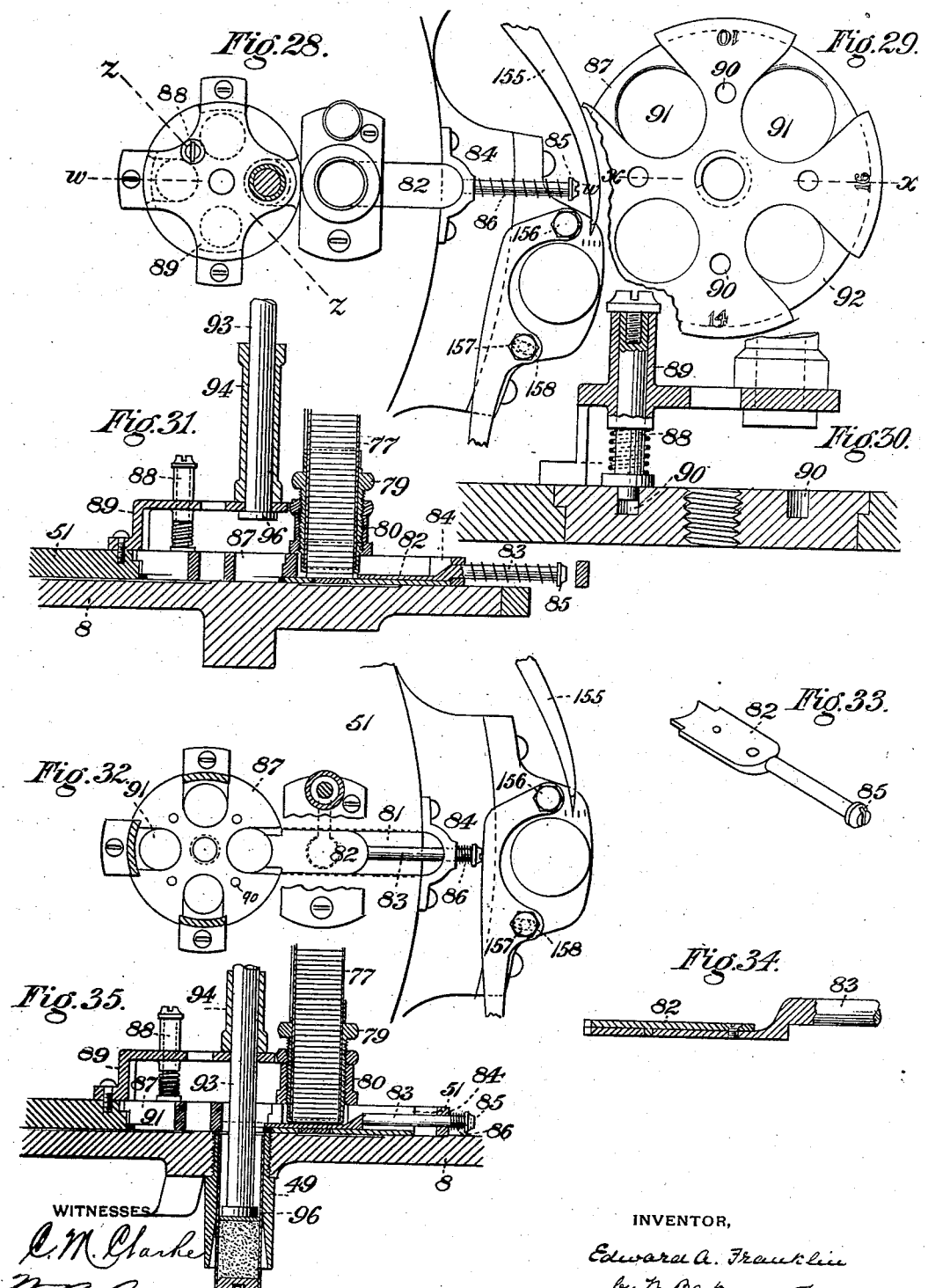
WITNESSES
INVENTOR,
Edward A. Franklin
by T. Bakewell Sons
his Att'ys.

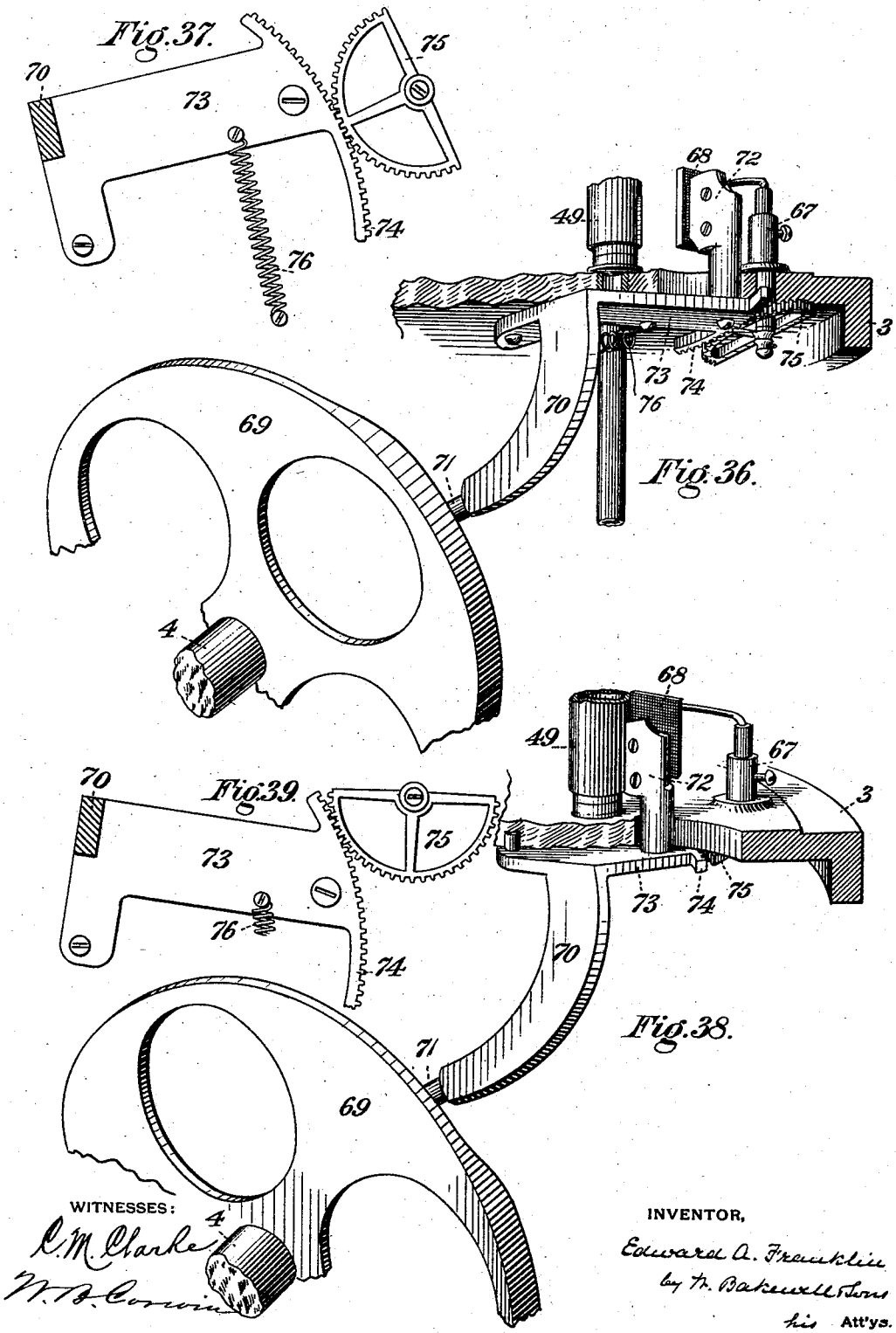

(No Model.) 15 Sheets—Sheet 11.
E. A. FRANKLIN.
CARTRIDGE LOADING MACHINE.
No. 396,359. Patented Jan. 15, 1889.
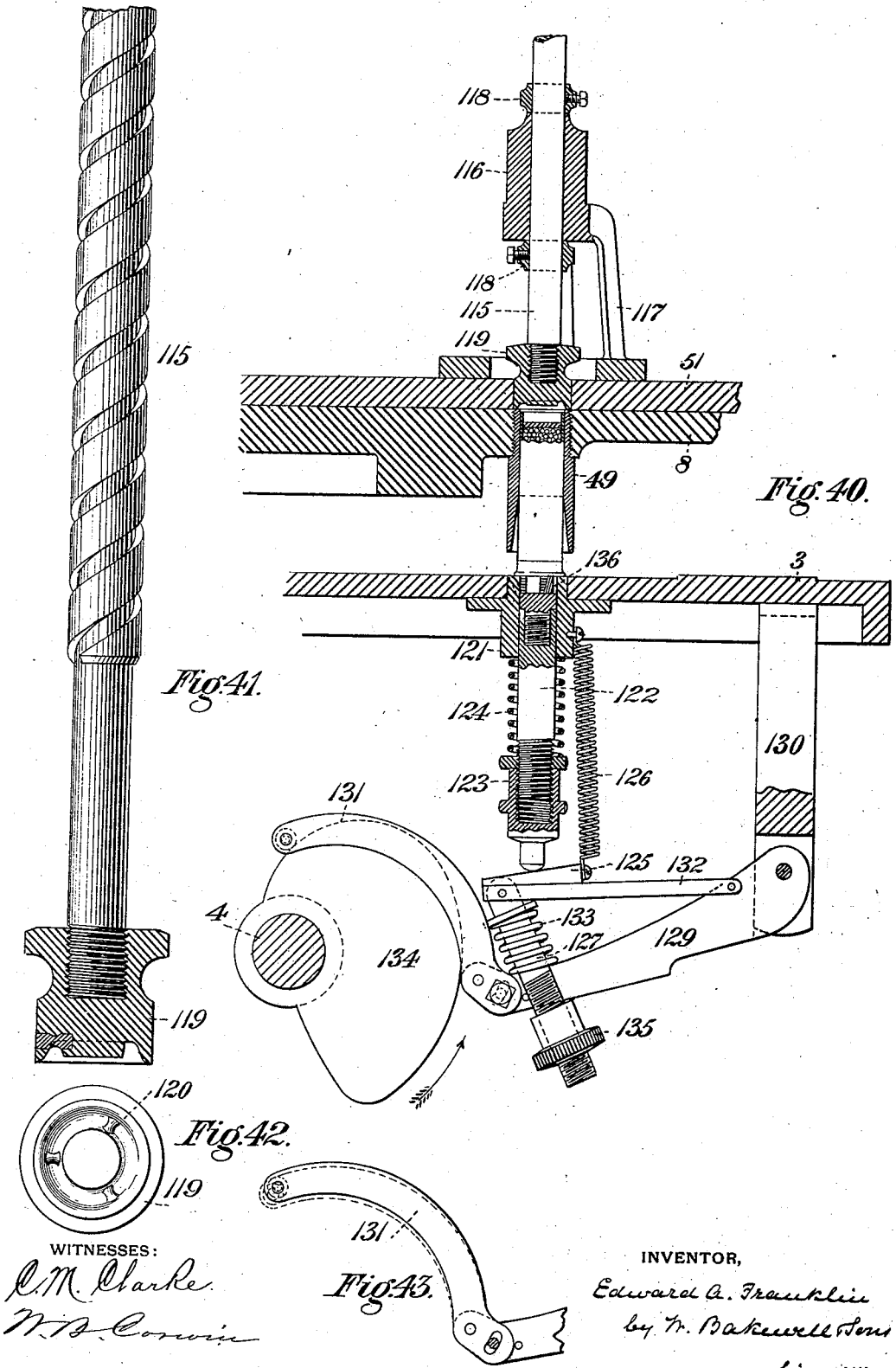
WITNESSES:
INVENTOR,
Edward A. Franklin
by W. Bakewell Sons
his Att'ys.

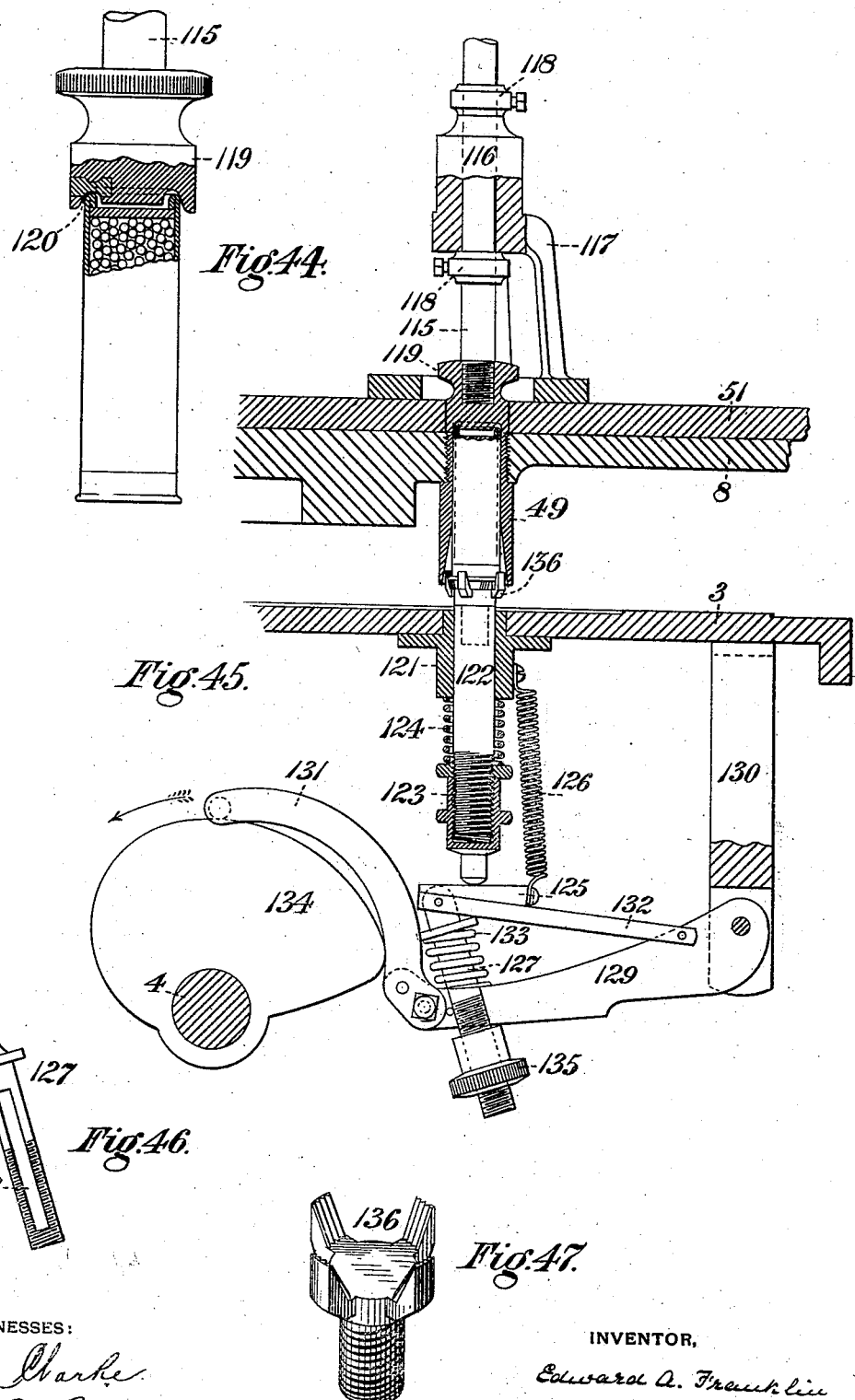

(No Model.) 15 Sheets—Sheet 13.
E. A. FRANKLIN.
CARTRIDGE LOADING MACHINE.
No. 396,359. Patented Jan. 15, 1889.
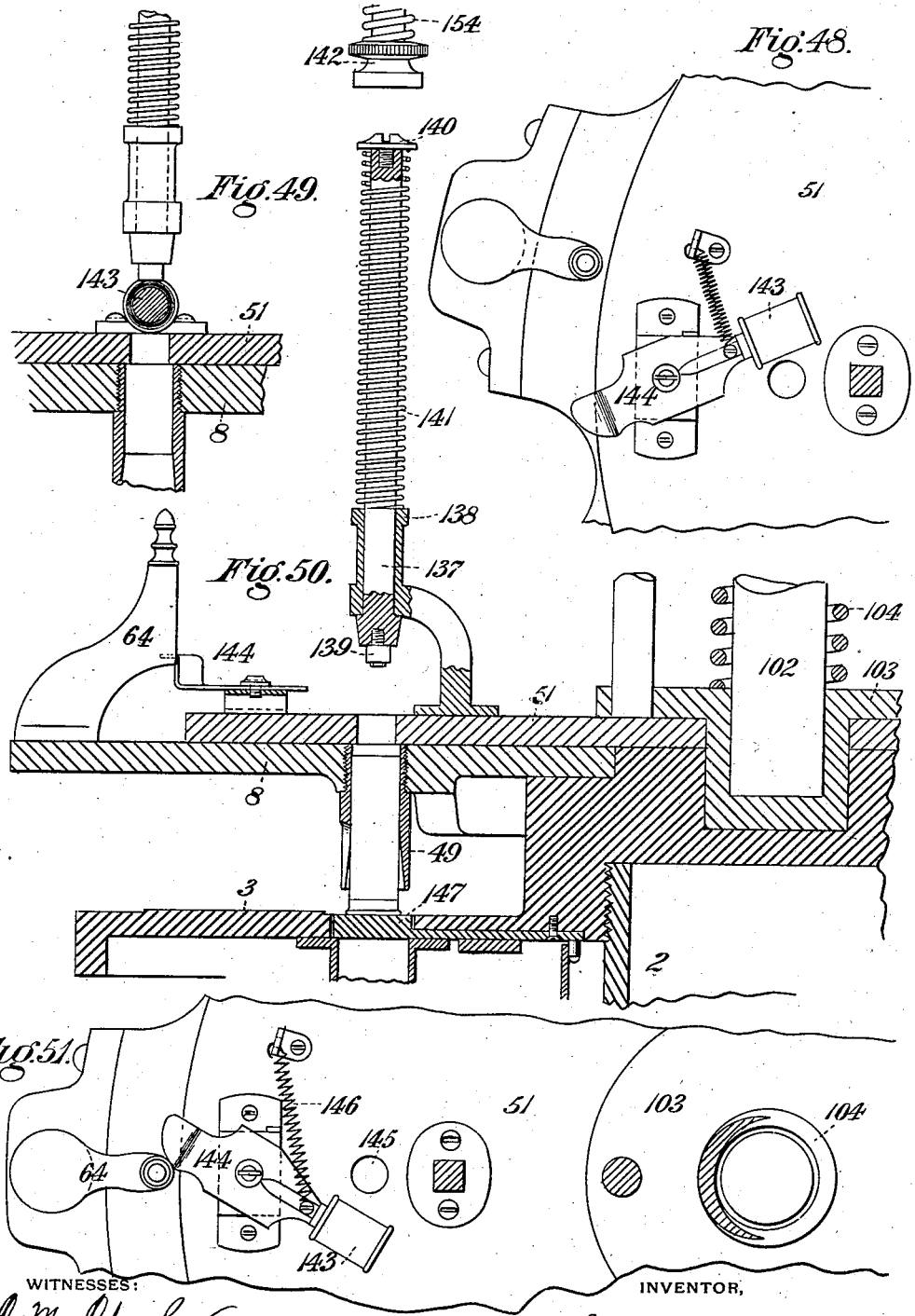
WITNESSES:
C. M. Clarke
W. B. Corwin
INVENTOR,
Edward A. Franklin
by W. Bakewell & Sons
his Att'ys.

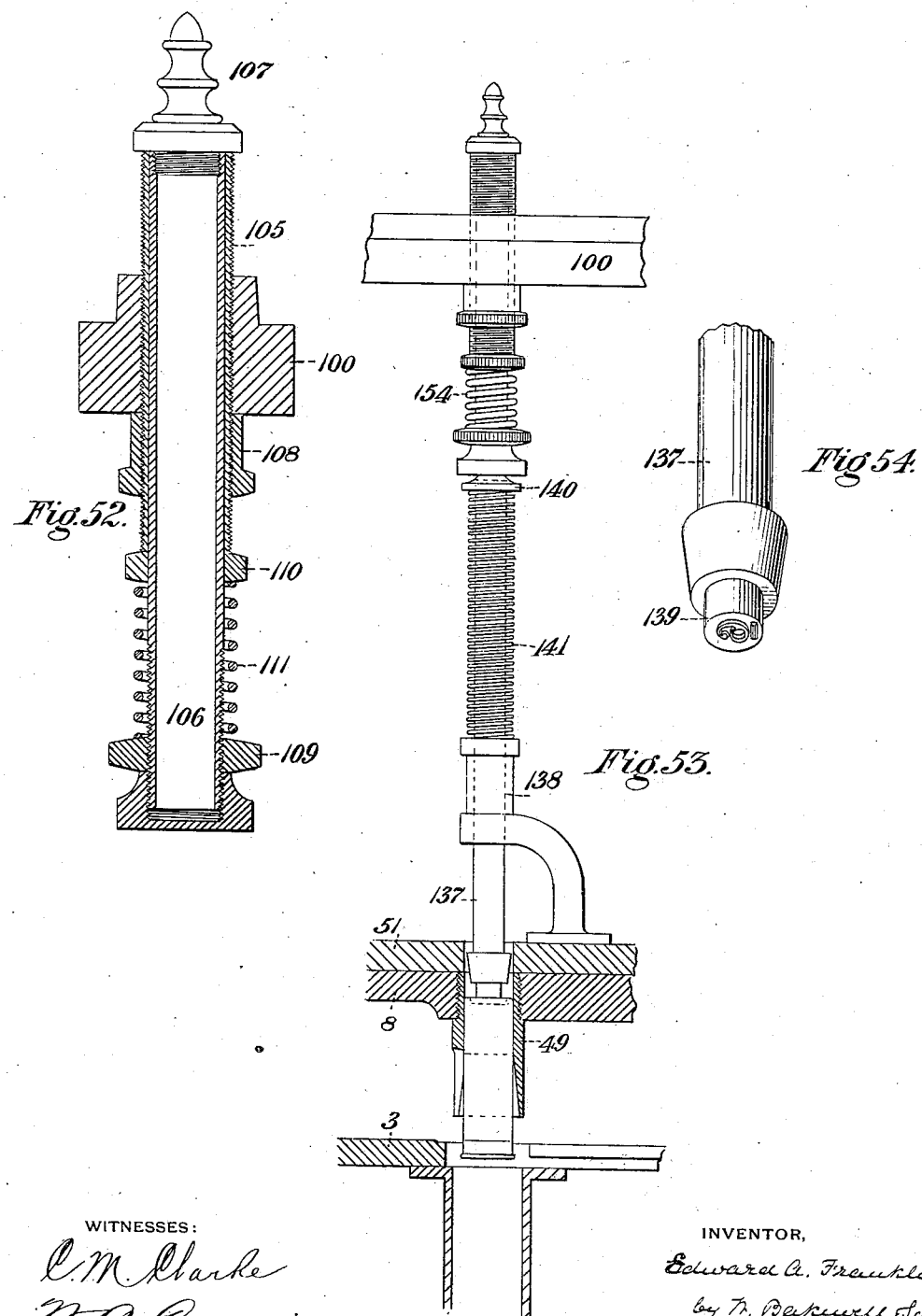

(No Model.) 15 Sheets—Sheet 15.
E. A. FRANKLIN.
CARTRIDGE LOADING MACHINE.
No. 396,359. Patented Jan. 15, 1889.
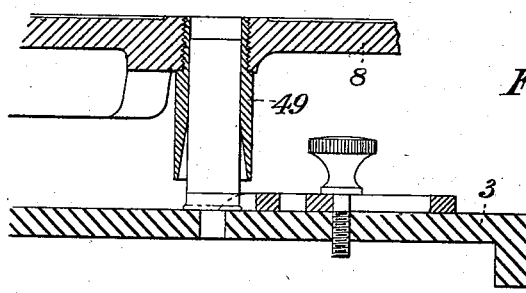
Fig.55.
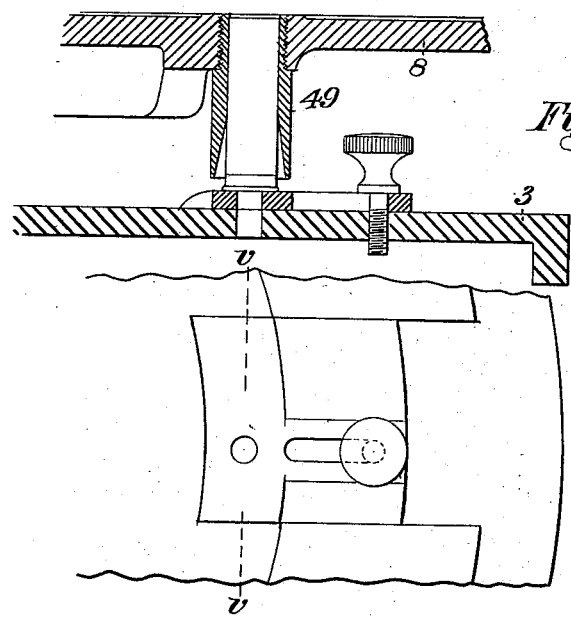
Fig.56.
Fig.57.
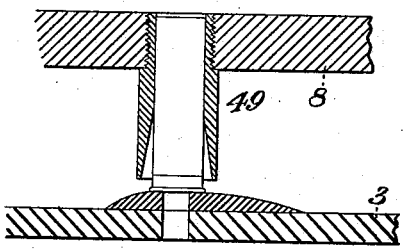
Fig.58.
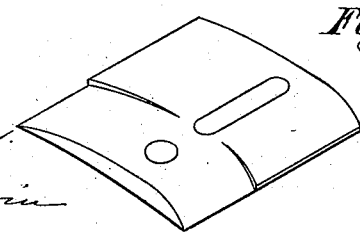
Fig.59.
WITNESSES:
INVENTOR,
Edward A. Franklin
by N. Bakewell & Sons
his Att'ys.

UNITED STATES PATENT OFFICE.

EDWARD A. FRANKLIN, OF BRENHAM, TEXAS, ASSIGNOR TO BAILEY FARRELL & CO., OF PITTSBURG, PENNSYLVANIA.

CARTRIDGE-LOADING MACHINE.

SPECIFICATION forming part of Letters Patent No. 396,359, dated January 15, 1889.

Application filed December 12, 1887. Serial No. 257,640. (No model.)

*To all whom it may concern:*

Be it known that I, EDWARD A. FRANKLIN, of Brenham, in the county of Washington and State of Texas, have invented a new and useful Improvement in Machines for Loading Cartridges; and I do hereby declare the following to be a full, clear, and exact description thereof, reference being had to the accompanying drawings, forming part of this specification, in which—

Figure 1:
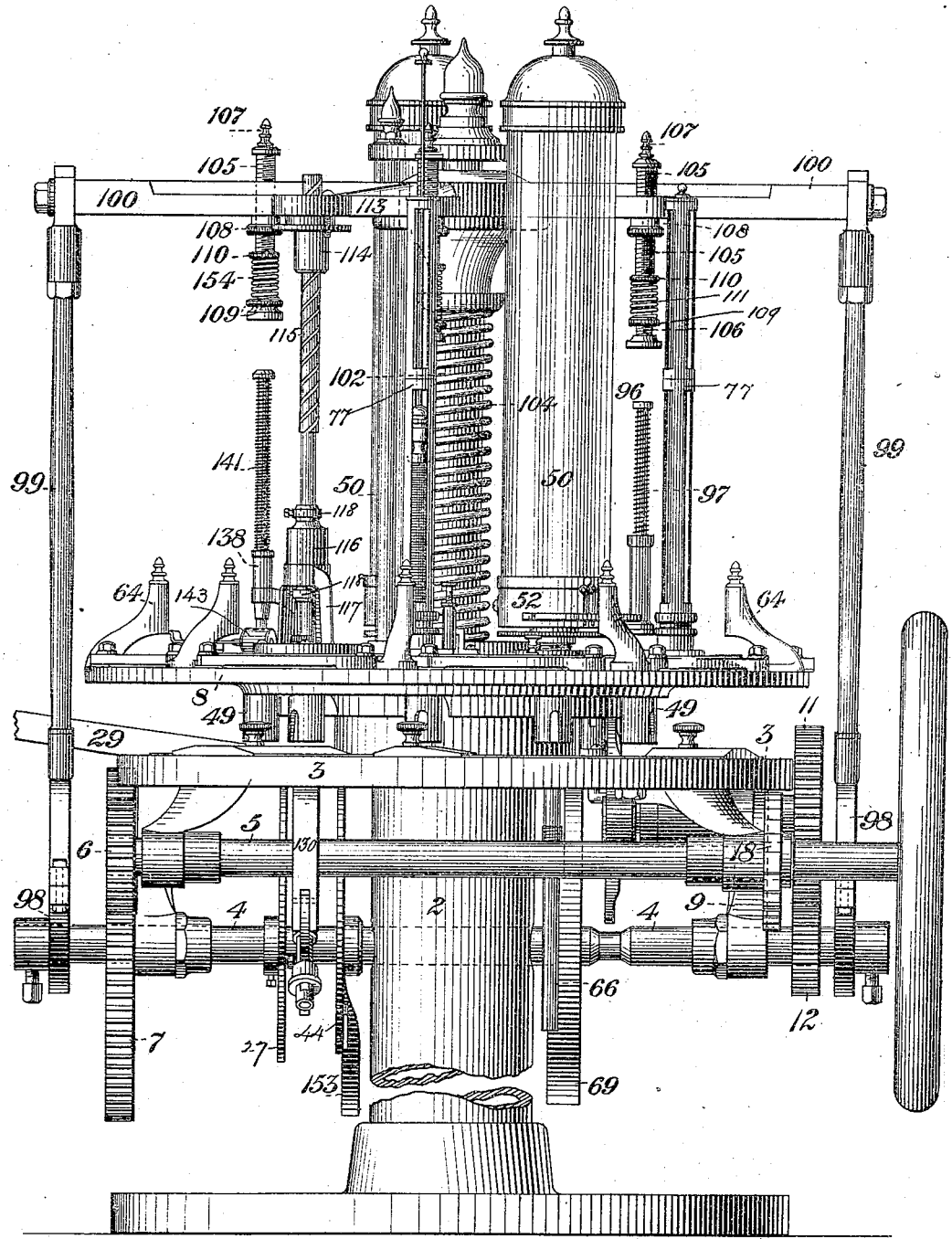
Figure 2:
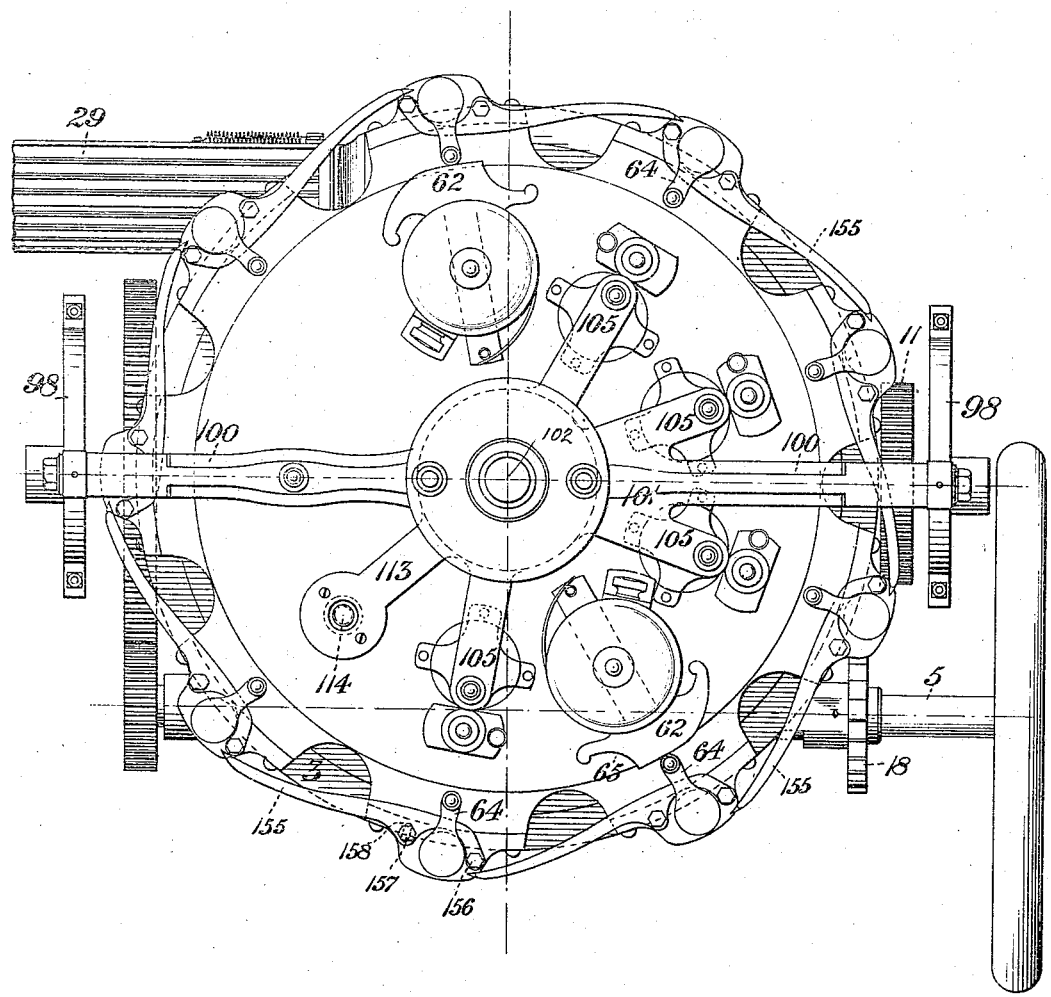
Figures 3, 4:
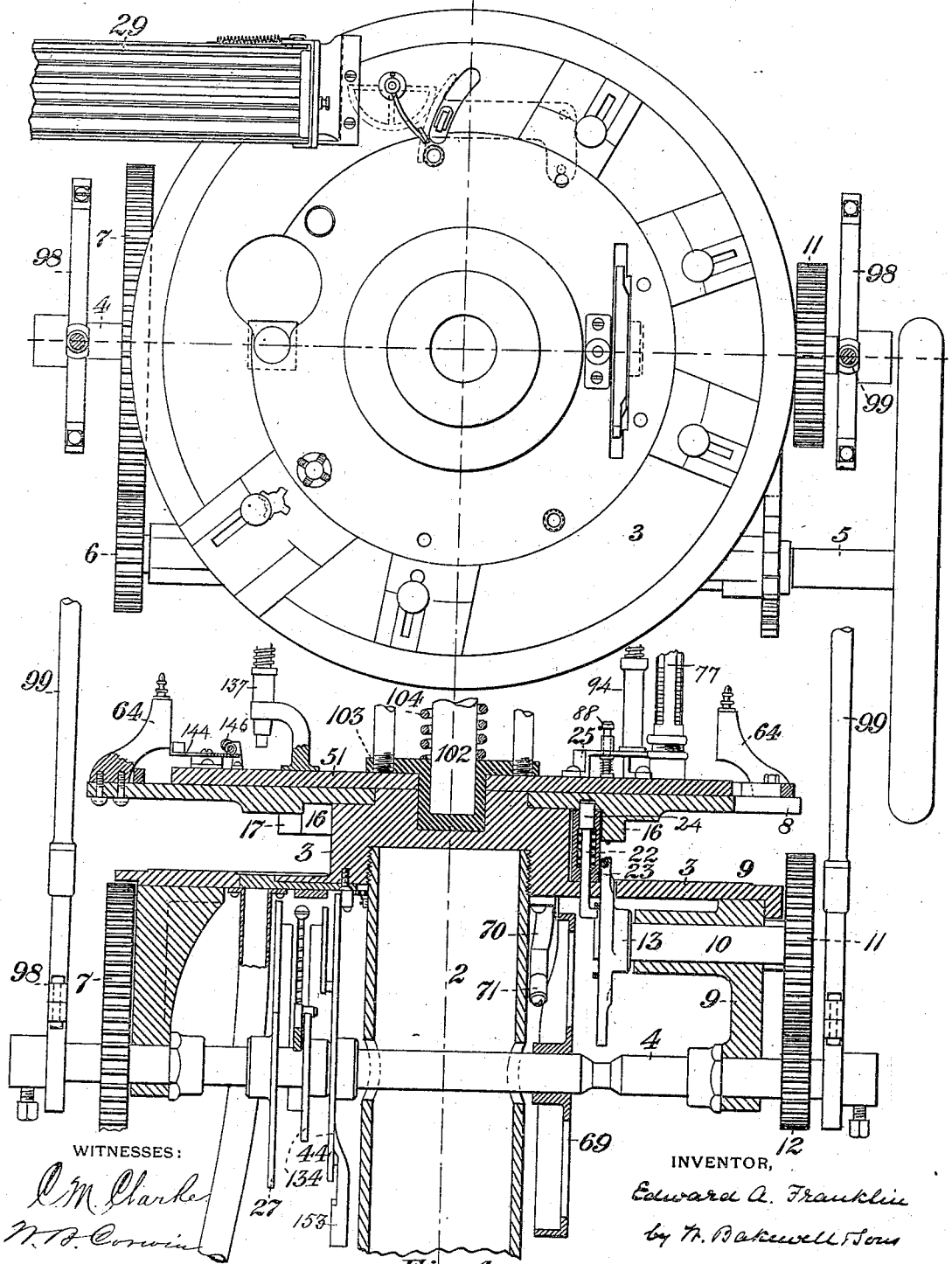

Figure 1, Sheet 1, is an elevation of my improved cartridge-loader. Fig. 2, Sheet 2, is a plan view of the same. Fig. 3, Sheet 3, is a plan view of the bed-plate. Fig. 4 is a vertical sectional view of the bed-plate, pedestal, revolving plate, and the top stationary plate, the loading devices being partially broken away. Fig. 5, Sheet 4, is a detached vertical sectional view of the lower portion of the powder or shot hopper. Fig. 6 is a like view of the upper and lower portions of the shot or powder hopper and the charger devices, showing the slide cutting off the charge closed and the slide for releasing the load from the charger open, so as to permit passage of the charge of powder or shot into the shell. Fig. 7 is a vertical sectional view of slides arranged in the feeding devices for cutting off the same from the powder or shot hopper when the same is not in use. Fig. 8 is a vertical sectional view of the lower portion of the powder or shot hopper and charging devices, the slides being open so as to form a communication between the charging devices and the hopper, while the slide at the lower portion of the charging device is closed so as to cut off the charge from the shell. Fig. 9 is a sectional view of part of the plate 3. Fig. 10 is a vertical sectional view of the device employed in emptying the powder and shot hoppers. Fig. 11 is a plan view of the slide and operating device by which communication is made and cut off between the charger and the hopper. Fig. 12, Sheet 5, is a perspective view, partially broken away, of the devices for feeding the shells from the shell-hopper to the shell-feeder. Fig. 13 is a perspective view, partially broken away, showing the devices for discharging the loaded shell from the machine after it has been stamped and crimped. Fig. 14, Sheet 6, is a perspective view, partially broken away, of the shell-hopper, the shell-feeder, the feeder being closed, and mechanism for operating the same. Fig. 15 is a side elevation of the shell-hopper, showing the shells contained therein in dotted lines, and the upper portion of the shell-feeder, the shell-feeder and gate being closed so as to prevent the shells from passing from the hopper to the feeder. Fig. 16 is a like view showing the shell-feeder open and the shell retaining gate in position to allow a single shell to pass into the feeder, while it retains the remaining shells in the hopper. Fig. 17 is a detached view, partially in section, of the shell-retaining gate. Fig. 18, Sheet 7, is a vertical sectional view, partially broken away, of the revolving plate, the upper part of the pedestal, the bed-plate, and the devices for operating and locking the revolving plate. Fig. 19 is a detached view, partially broken away, of the arms which operate the revolving plate and the cams for locking and unlocking the same. Fig. 20 is a view similar to Fig. 18, showing the revolving plate locked in position. Fig. 21, Sheet 8, is a sectional view, partially broken away, of the lower portion of the wad-hopper and the devices for regulating the same, so as to accommodate different-sized wads, also devices for shutting off the feed from the wad-hopper. Fig. 22 is an elevation of the upper portion of the wad-hopper and weighted rod. Fig. 23 is a horizontal sectional view of the wad-hopper on the line *x x* of Fig. 22. Fig. 24 is a like view of the wad-hopper on the line *y y*, the wad-hopper being closed, so as to retain the wads within the hopper. Fig. 25 is a like view on the same line, the side being open so as to enable the wads to be charged to the hopper. Fig. 26 is a detached view of the devices for shutting off the feed of the wad-hopper. Fig. 27 is a vertical sectional view of the lower portion of the wad-hopper, showing the devices for shutting off the feed of the wads in position. Fig. 28, Sheet 9, is a detached plan view of the wad-shoving slide of the wad-hopper and the wad-plunger guide, showing the plate for changing to different gages in dotted lines. Fig. 29 is a detached enlarged view of the plate for changing to different-gaged wads. Fig. 30 is a vertical sectional view, enlarged, on the line z z of Fig. 28. Fig. 31 is a vertical sectional view on the line w w of Fig. 28. Fig. 32 is a detached plan view, partially in section, of the wad-operating mechanism and guide-plate, the wad being shoved into position over the opening in the plate. Fig. 33 is a detached view of the wad-shover. Fig. 34 is a detached side view, partially in section, of the wad-shover. Fig. 35 is a vertical sectional view of the wad-hopper, the wad-plunger, and the wad-shover, showing the wad-plunger depressed and within the cartridge-shell. Fig. 36, Sheet 10, is a perspective view of the shell-stamping device. Fig. 37 is a view showing the mechanism for working the ink-pad of the stamping device when it is in the position shown in Fig. 36, the stamping device being removed from the shell. Fig. 38 is a view similar to Fig. 36, showing the stamping device away from the inking-pad and against the shell. Fig. 39 shows the operating mechanism of the stamping and inking mechanism when in the position shown in Fig. 38. Fig. 40, Sheet 11, is a vertical sectional view of the crimping mechanism, showing the crimping-plunger in its lowered position, the shell being above the plunger ready to be raised up to the crimper and crimped. Fig. 41 is a view of the worm of the crimping-rod and the lower portion or head of the crimper in section attached to the rod. Fig. 42 is a plan view of the face of the crimping-head. Fig. 43 is a detached view of the adjustable arm or lever, by which the elevating part of the crimping mechanism is operated. Fig. 44, Sheet 12, is a detached view, partially in section, of the crimping-head, showing a shell crimped in position. Fig. 45 is a vertical sectional view, similar to Fig. 40, showing the shell in position when crimped. Fig. 46 is a detached view of the regulating-arm of the crimping mechanism by which the pressure of the crimping-plunger may be regulated. Fig. 47 is a detached view of the head of the crimping-plunger. Fig. 48, Sheet 13, is a detached plan view of the inking mechanism for inking the wad-stamper. Fig. 49 is a vertical sectional view of the same, showing the ink-roller passing under the wad-stamper. Fig. 50 is a vertical sectional view showing the shell under the stamper ready to be stamped. Fig. 51 is a plan view of the same, the stamp being detached. Fig. 52, Sheet 14, is a detached sectional view of the stamp-hammer, showing the screw-nut and sleeves for regulating the length and pressure of the blow of the hammer. Fig. 53 is a side elevation, partly in section, showing the stamp-hammer, the wad-stamper, and the shell after it has been stamped ready to be discharged from the machine. Fig. 54 is a detached perspective view of the face of the wad-stamper. Fig. 55, Sheet 15, is a vertical sectional view of the revolving plate, the bed-plate, the shell-holder, and a collar resting upon the revolving plate. Fig. 56 is a like view showing the regulating-plate which is adjustably secured to the bed-plate for the purpose of regulating the distance between the revolving plate and the regulating-plate, so as to accommodate shells of different lengths. Fig. 57 is a plan view of the bed-plate and the regulating-plate in the position shown in Fig. 56. Fig. 58 is a vertical sectional view on the line v v of Fig. 57. Fig. 59 is a perspective view of the regulating-plate.

Like symbols of reference indicate like parts in each.

My invention relates to an improvement in machine cartridge-loaders, and is adapted to load cartridge-shells automatically, the machine being operated by suitable power; and it consists in mechanism for feeding the empty cartridge-shells from a shell-hopper into a cartridge-shell feeder, from which the shells are fed into the cartridge-holders, which are attached to the revolving plate, and are thence carried first to a powder-hopper, where a charge of powder is fed into the shell, the plate being held stationary during the operation, while at the same time another shell is fed into the feeder and delivered to the next shell-holder in the revolving plate. The first shell is then brought by the revolution of the plate under a wad-hopper, the second shell is brought under the powder-hopper, and the third shell is fed from the shell-hopper to the shell-feeder, and thence to the third shell-holder in the revolving plate. The first shell is then brought under a second wad-hopper, and the fourth shell is fed into the fourth holder. The first shell is then brought under another wad-hopper and receives a third wad should the same be required, and at the same time the fifth shell is fed into the fifth holder. The first shell is then carried under the shot-hopper and receives its shot, while the sixth shell is fed into the sixth shell-holder. The first shell is then carried under a wad-hopper, and the final wad is inserted, while the seventh shell is fed into the seventh holder in the revolving plate. The first shell is then carried under the crimper, by means of which the edge of the shell is crimped over the shot-wad, and the eighth shell is fed into the eighth holder. The first shell is then carried under the wad-stamper, which stamps the wad and delivers the finished cartridge from the machine, while at the same time the ninth shell is fed into the ninth and last of the series of shell-holders in the revolving plate. By these means at each one-ninth revolution of the revolving plate a shell is delivered to a shell-holder, a charge of powder is fed into one of the other shells, the wads and shot are fed into their respective shells, and a loaded shell is delivered from the machine, so that the operation is continuous.

I will now describe my invention, so that others skilled in the art may manufacture and use the same.

In the drawings, Figs. 1 and 4, 2 represents the base or pedestal of the machine, secured to the upper portion of which is the bed-plate 3. Mounted in the pedestal 2 is the main power-shaft 4, to which power is applied by the power-shaft 5 and gear-wheels 6 and 7. Mounted on the pedestal 2 is the revolving plate 8, to which power is applied as follows: Secured to the bed-plate is a journal-bracket, 9, in which is mounted the short shaft 10, having the gear-wheel 11, which meshes with the gear-wheel 12, which is connected to the main shaft 4. At the inner end of the shaft 10 is a collar, 13, which is keyed to the shaft, and extending from this collar, integral therewith, are two oppositely-radiating arms, 14 and 15, the ends of which are rounded. (See Sheet 7.) On the base of the revolving plate 8 (see Fig. 18) is a projecting annular flange, 16, which is provided with rounded recesses in its periphery or ratchets 17, with which the ends of the arms 14 15 engage, so that as the arms 14 15 revolve on the short shaft 10 they shall engage the ratchets so as to impart an intermittent rotary motion to the plate 8. The number of these ratchets 17 should correspond with the number of shell-holders contained in the plate. In the drawings nine of these ratchets and cartridge-holders are indicated. On the power-shaft 5 is a toothed ratchet-wheel, 18, (see Figs. 1 and 18,) with which a pawl, 19, engages, said pawl being pivoted to the journal-bracket 9. The purpose of this pawl and ratchet-wheel is to prevent a reverse motion of the machine. On the sides of the collar 13 are two cams, 20 21, which engage with the bent end of a lock-rod, 22, which is mounted in a suitable box, 23, fixed to the bed-plate, the rod being provided with a locking-head, 24, which is adapted to engage with the slots 25 in the lower face of the revolving plate. Within the box 23, below the locking-head 24, is a spiral spring, 26, the force of which is exerted upward, so as to retain the end of the locking-head 24 within the slots 25. These slots 25 are set between the ratchets 17, so that after the plate 8 has been given a one-ninth revolution by the arms 14 and 15 one of the slots is brought directly over the head of the locking-rod. When, however, the next stroke of the arms 14 and 15 is about to occur, one of the cams 20 21 engages with the bent end of the lock-rod 22, and depresses the same so as to withdraw the head of the lock-rod from the slot, and thereby to permit the revolving plate to perform its one-ninth revolution, the lock-rod being released from the cam as soon as this partial revolution is completed.

Secured to the bed-plate 3 is the shell-hopper 29, which is inclined to the horizontal plane of the bed-plate, and is provided on its lower surface with a series of ridges or grooves, 30, (see Figs. 12 and 14,) the purpose of which ridges is to raise the body of the shell above the bottom of the hopper sufficiently to prevent the rim on the head of the cartridge-shell from coming in contact therewith, and thereby the shells are permitted to roll down the inclined hopper in a straight line. At the lower end of the hopper 29 is a curved inclined leaf, 31, which may be a bent continuation of the hopper. At the mouth of the hopper, situate above the same, is a retaining shield or guard, 32, which is formed of two bent sections of sheet metal, united to each other by a slot and set-screw, 33, (see Fig. 17,) so that the width of the retaining-shield, which is formed by the two metal plates, may be increased or diminished. This shield is attached to two vibrating arms, 34, which are pivoted to the sides of the shell-hopper, and at the lower end of said arms, below the pivotal point, is a slot, 35, engaging with which slot is the bent end of a curved rod, 36; also secured to the slot 35 is one end of a spiral spring, 37, the other end of which is secured to the shell-hopper. On a line with the leaf 31, and secured to the bed-plate 3, is the shell-feeder, which is a cylindrical tube, 38, having a hinged leaf, 39, so arranged that it may be brought back until the upper end of the lead forms a continuation of the lower end of the leaf 31.

Situated below the leaf 31 is a wire journal-rod, 40, at one end of which is an eye, through which the bent rod 36 passes, so that the end of the rod 26 shall be within the path of the leaf 39 as it is brought back to the leaf 31. When the leaf 39 is so brought back and engages with the end of the rod 36, the free end of the arm 34 is depressed, while the shell-retaining guard 32 is raised sufficiently to permit the passage of a shell from the hopper; but when it is raised to this height the other end of the curved retaining-guard, being depressed, comes down before the next succeeding shell in the hopper, permitting but one shell to pass at the same time. It is therefore necessary that the retaining-guard 32 should be kept by means of the set-screw 33 at a size of about one-half the size of the circumference of the shells to be loaded, whether these shells are of ten, twelve, or other gage in circumference.

Within the cartridge-shell feeder 38 is a spring-plunger, 41, (see Figs. 12, 12ª, and 14,) which is provided within the shell-feeder with a spiral spring, 42, and outside of the same with a friction-roller, 43. Keyed to the main power-shaft 4 is the cam-wheel 27, provided with a shoulder, 28, which shoulder engages with the friction-wheel 43, and thereby depresses the spring-plunger 41 until the end of the shoulder 28 passes over the friction-wheel 43. Keyed to the power-shaft 4 is a second cam-wheel, 44, which engages with a friction-roller, 45, which is journaled to a quadrant arm, 46, which arm is secured to the hinged leaf 39 of the shell-feeder. The elbow or shoulder 28 on the cam-wheel 27 engages with the friction-wheel 43 about the same time the cam on the periphery of the wheel 44 begins to engage with the friction-wheel 45, so that as the spring-plunger 41 is depressed the quadrant arm 46 and hinged leaf 39 are drawn backward until the upper end of the leaf 39 joins the lower end of the leaf 31, at which time the shoulder 28 has passed from the friction-roller 43 on the plunger 41, the plunger 41 being retained in its depressed position, however, by the cam-surface of the wheel 27. As the leaf 39 is drawn back, the arm 36 is depressed, so that a shell passes from the hopper 29 and drops onto the leaves 31 and 39 of the shell-feeder.

Extending from the lower fixed portion of the cartridge-feeder 38 is a rod, 47, from which a spiral spring, 48, extends to the quadrant arm 46, so as to exert a pressure on the arm and tend to close the hinged leaf 39. As the cams on the peripheries of the cam-wheels 44 and 27 decrease, the spring 42 of the plunger 41 and the spring 48 of the quadrant arm 46 draw the plunger upward and at the same time close the hinge-leaf of the shell-feeder, so that when by the revolution of the revolving plate 8 a shell-holder is brought over the upper end of the cartridge-feeder the hinged leaf 39 has closed, and the spring-plunger 41 forces the shell from the feeder into the shell-holder. These shell-holders 49 are shown in Figs. 1 and 40, and are composed of cylindrical tubes, which are attached to and extend from the lower face of the revolving plate 8 down toward the bed-plate 3, the mouth of the holder being slightly flared, so as to receive the shell as it is forced into the holder by the plunger 41. When the plunger 41 has delivered the shell to the shell-holder, the end of the plunger is flush with the upper surface of the bed-plate, as shown in Fig. 14. During the operation of delivering the shell from the shell-hopper to the feeder and from the feeder to the shell-holder the revolving plate is locked by the locking-rod 22, in the manner already described, and the plunger 41 remains in its elevated position until the next partial movement of the revolving plate has moved the shell sufficiently to cause the shell to pass from off the plunger onto the face of the bed-plate. By the one-ninth revolution of the revolving plate the shell in the holder is carried under the powder-hopper 50, which is mounted on top plate, 51, fixed to an elevation on the bed-plate 3 over the pedestal 2.

The powder and shot hoppers may be composed of a cylindrical glass jar fitting in a metal cap or socket, 52, which socket is secured to the bracket 53 in a slot, 54, of the bracket by a thumb-screw, 55. (See Fig. 5.)

In the plate 51, directly below the powder and shot hoppers, is an opening, 56, above which is a sleeve, 57, which is secured to the plate 51, the outer face or collar of the sleeve being provided with a screw-thread. Engaging with this screw-thread is an internally-screw-threaded sleeve, 58, which is provided with a collar on its outer face, so that by turning the collar the sleeve 58 is raised or lowered on the sleeve 57. The upper end of this threaded sleeve 58 is secured to the base of the powder and shot hoppers, while extending from the base of the powder and shot hoppers, within the sleeves 57 and 58, is an unthreaded sleeve, 59. The purpose of this arrangement is to enable the capacity of the charger, which is constituted by the sleeves 57 and 59, to be either increased or diminished by raising or lowering the powder or shot chambers by turning the sleeve 58 and loosening the thumb-screw 55. When the size of this powder-charger has been adjusted as desired the powder and shot hoppers are fixed by again tightening the thumb-screw 55 in the slot 54.

At the base of the plate 51, below the opening 56 and above and resting on the revolving plate 8, is a slide, 60, which is provided with an opening similar to the opening 56, and is secured to the plate 51 by means of the slot and thumb-screw 61. The purpose of this slide is to cut off the lower mouth of the powder-charger from the upper opening above the shell-holders in the revolving plate 8, so as to permit the powder and shot hoppers to remain closed until a shell is brought beneath them ready for its charge of powder or shot, when they are opened and remain open during the operation of the machine.

Within the socket 52 of the powder or shot hopper is a spring-slide, 62, which is provided with an opening, 63, similar to and above the upper opening in the sleeve 59. On the outer end of this slide 62, outside of the hopper, is a cam-arm projecting at right angles to the line of movement of the slide, which arm is adapted to engage with the face of the projecting post 64, which is secured to the revolving plate 8, one of these posts 64 being situated on the plate 8 opposite each shell-holder, so that when the shell-holder containing the shell is brought below the powder or shot hoppers the post 64 comes in contact with the cam end of the spring-slide 62 and forces the same back until the opening 63 is removed from the charger 59, thereby cutting off communication between the charger and the hopper. When the openings in the plate 8 over the shell-holders come beneath the powder and shot hoppers, the slide 62 has been pushed back so as to completely close the communication between the hopper and the charger, and the powder or shot contained in the charger drops through the opening in the revolving plate 8 into the shell contained in the shell-holder. At the next partial movement of the plate 8 the slide 62 is released suddenly by the quick curve 65 in the other end of the arm 62, which allows the spring-slide to snap the slide into place, so that the charger may become filled before the next shell is brought beneath the hopper.

In Fig. 10 is shown a tube, 66, which may be screwed into or otherwise secured within the cartridge-holders, and which is situate under the hopper, so that when the hopper is turned so as to permit the slide 62 to pass the post 64 the contents of the hopper may be drawn through the tube into a suitable receptacle. This is sometimes necessary when it is desired to change the kind of powder or size of shot.

During the operation of filling the shell with powder the shell is stamped with any name or symbol desired by the following mechanism: Situated on the upper face of the bed-plate 3 is a standard or socket, 67, in which is fixed a curved arm having an inking-pad, 68. Keyed to the main power-shaft 4 is a cam-wheel, 69, having a cam on its side or face. Pivoted to the lower face of the bed-plate is the crank-lever arm 70, the free end of which is provided with a friction-roller, 71, which is arranged to engage with the cam on the wheel 69. At the other end of the crank-lever and secured thereto is a type-holder, 72, in the face of which is inserted or formed the symbol or name desired to be printed on the side of the cartridge-shell. On the outer face of the arm 73 of the lever 70 is a toothed segment, 74, which engages with the teeth of a segment, 75, which is pivoted to the lower face of the bed-plate 3 by the extension of the lower end of the post 67. When the cam of the wheel 69 engages with the arm 71 of the lever 70, the printing-piece 72 is held away from the cartridge-shell, and at the same time the inking-pad is by the turning of the segments 74 and 75 brought against the type-face of the printing-post. When, however, the cut-away portion of the wheel 69 comes over the friction-wheel 71, the spring 76, one end of which is secured to the lever-arm 73 and the other end to the bed-plate, draws the face of the printing-post 72 against the shell, the cartridge-holder being slotted, as shown in Fig. 1, to permit the passage of the face of the type through the holder against the shell.

After the cartridge-shell has received its powder and the symbol or name has been printed on the side of the shell, at the next partial movement of the plate 8 the shell containing the powder is brought under the wad-hopper 77. This wad-hopper is composed of two cylinders, one fitting within the other, each of which cylinders is cut away one-half on one side and is slotted on the other, as shown in Figs. 24 and 25. These cylinders are united at the top by a cap, 78, and at their bottom the inside cylinder extends to the base of the sleeve 79, while the outer cylinder rests on a collar formed on the inner cylinder. By these means the cylinders may be turned one within the other, so as to open the hopper for the reception of wads, as shown in Fig. 25. At the base of the hopper the sleeve 79, which is provided with an exterior screw-thread, engages with the threaded socket 80, which is secured to the face of the plate 51.

In the plate 51, below the wad-hopper, is a recess, 81, within which is fitted a slide, 82, from which extends an arm, 83, through a bracket, 84, which bracket is secured to the periphery of the plate 51. At the end of the rod 83 is a head or nut, 85, and between the nut and the bracket 84 is a spiral spring, 86.

The effect of the force of the spring is to keep the slide 82 drawn toward the bracket 84 away from beneath the wad-hopper 77. This slide 82 is formed of two strips of metal removably united together, as shown in Fig. 34, so that by removing the upper plate the slide may be adapted to use thinner wads, and it is for this purpose that the sleeve 79 may be screwed up or down within the socket 80, so as to increase or diminish the distance between the bottom of the sleeve 79 from the base of the slide-cavity 81 to accommodate different thicknesses of wads.

Beyond the wad-hopper 77, at the inner end of the slot 81, is a circular plate, 87, (shown in Fig. 29,) which circular plate is provided with two or more openings of different sizes to accommodate different sizes of wads, which plate is embedded in the plate 51, and secured in position by a spring locking-bolt, 88, which passes through a bracket, 89, which bracket is secured to the plate 51 and enters key-openings 90 in the plate 87. By raising this spring-bolt and turning the plate 87 any one of the wad-openings 91 may be brought opposite the end of the recess 81, the inserted plate 87 being also recessed, as at 92, so as to continue and finish the recess 81. Secured to the revolving plate 8, at the periphery of the same, are the inclined arms 155, one end of which is pivoted to the plate by a bolt, 156, while the arm is fixed in position by means of the set-screw nut 157, fitting in the slot 158, by means of which the position of the arms may be regulated so as to accommodate different-sized wads. As the plate 8 is revolved, the face of the arms engages with the wad-slide rod 83, and, owing to the inclined face of the arms 155, gradually forces the wad from beneath the hopper under the wad-plunger in the opening 91.

Directly in the rear of the wad-hopper is the wad-plunger 93, which is mounted in a suitable guide, 94, which is attached to the bracket 89. This wad-plunger consists of a sliding rod, at the lower end of which is a head, 95. (See Figs. 1 and 35.)

Between the guide 94 and the head or button 96, and encircling the plunger 93, is a spiral spring, 97, which contracts when the plunger is depressed. On the main shaft 4, on both sides of the machine, is an eccentric yoke, 98, to which yoke are attached the arms 99, which at their upper ends are attached to a cross-bar, 100, which bar, at the middle portion thereof, is provided with a yoke, 101, which encircles a rod or standard, 102, extending down to the bed-plate 3, on which it rests, or is secured in a step, 103, which step is secured to the face of the top plate, 51.

Between the yoke 101 and the step 103 is a spiral spring, 104, which is arranged to be compressed when the yoke descends on the standard 102. Secured to arms of the cross-bar 100 are cylindrical tubes 105, in which are mounted four wad-hammer rods, 106, directly over the four wad-plunger rods. These tubes 105 are secured to the arms of the cross-bar by a screw-thread, while the end of the hammer-rod which projects above the tubes is provided with a head or button, 107. The tubes are secured in position in the arms of the cross-bar by a jam-nut, 108. Engaging with the screw-threaded tube 105, and below the arm of the cross-bar, is a screw-nut, 109, which loosely encircles the wad-hammer rod, and between this screw-nut and a collar, 110, on the tube 105 is a spiral spring, 111. By raising or lowering the nut 109 the spiral spring either contracts or expands, so as to exert a pressure downward on the hammer-rod in the tube. By the revolution of the main shaft 4, by means of the cam and yoke 98 and arms 99, when the wad has been delivered from the hopper 77 directly under the wad-plunger 93 in the slot 81, as shown in Fig. 32, the cross-bar 100, descending, forces the wad down from the slot 81 through the opening 91 and the opening in the revolving plate 8 into the cartridge-shell in the cartridge-holder upon either the powder or shot. By means of the spiral spring 111 the force of the blow is regulated so as to drive the wad lightly or strongly into the shell. As shown in Fig. 2, there are three of these wad-hoppers between the powder and shot hoppers and one wad-hopper beyond the shot-hopper, the operation of all of which is the same, as is also the construction of the stamping hammer and rod for stamping the number on the wad, which will hereinafter be described.

At the bottom of the tubes 105 is a milled collar, 110, by means of which and the screw-thread on the tube the tube may be drawn up or down in the arms of the cross-bar, so as to lengthen or decrease the stroke of the hammer-rod.

Extending from the cross-bar 100 is an arm, 113, which is similar to the wad-hammer arms. In this and secured thereto by suitable means is a threaded nut, 114, with which the worm-rod 115 engages, the rod passing through the threaded nut. The lower end of this rod passes through a sleeve, 116, mounted on a bracket, 117, which is secured to the top plate, 51, the rod being held in position by the collars 118, which are keyed to the rod above and below the sleeve 116. At the lower end of the rod, and secured thereto by a screw-thread or other suitable means, is the crimping-head 119, the face of which is shown in Fig. 42, having an annular groove provided with inclined projections 120. This crimping-head 119 fits in an opening in the fixed plate 51. After the loaded shell has received its final wad, it is brought by the movement of the revolving plate 8 directly under the crimper, as shown in Fig. 40. At this point in the bed-plate 3 is a guide-cylinder, 121, within which is the crimping-plunger 122, at the lower end of which is the threaded thimble 123, and between the threaded thimble and the socket 121 is a spiral spring, 124.

Below the thimble 123 is a lever-arm, 125, one end of which is secured to the socket 121 by a spiral spring, 126, while the other end is pivoted to the arm 127, which arm 127 (shown in Fig. 46) is provided with a slot, 128, through which a lever-arm, 129, passes, one end of which lever-arm is secured to the hanger 130, extending from the bed-plate 3, while the other end is secured to the curved cam-yoke 131. The upper end of the arm 127 is also secured to the lever-arm 129 by the bar 132, which is pivoted both to the arm 127 and to the lever-arm 129. Between this bar and the lever-arm 129, encircling the arm 127, is a spiral spring, 133. The cam-yoke 131 engages with the cam 134, which is keyed to the main shaft 4. On the end of the arm 127, below the lever-arm 129, is a thumb-nut, 135, by means of which the distance between the upper end of the arm 127 and the lever-arm 129 may be adjusted. As the cam 134 revolves, the arm 127 is elevated through the yoke 131, which raises the plunger 122 to the position shown in Fig. 45. On the head of this plunger is a crown, 136, which engages with the loaded cartridge-shell and raises it up against the face of the crimper-head 119. Then the cross-bar 100 descending the nut 114 causes the rod 115 to revolve on its axis, thereby rotating the crimping-head 119 against the top edge of the shell, whereby the edge of the shell is turned in the usual manner in crimping-machines.

By means of the screw-thimble 123 the length of the plunger 122 may be regulated so as to accommodate shells of different lengths, raising all of them to the height required. In order, however, to prevent the shell from being forced too rigidly against the crimper, the spiral spring 133 is mounted on the rod 127, and the force of the spring is regulated by the thumb-nut 135. After the shell has been loaded and crimped, by the next partial movement of the revolving plate 8 it is carried under the wad stamping and discharging device. (Shown on Sheet 13.) This device consists of a plunger, 137, mounted in a guide, 138, which guide is secured by a suitable standard to the top plate, 51, so that the plunger 137 shall be set directly over an opening in said plate.

On the end of the plunger 137 is a figured stamp, 139, on the face of which the number of the shot with which the shell is loaded is formed. At the top of the plunger 137 is a button or head, 140, and between this button and the guide 138 is a spiral spring, 141. Above the stamping-plunger is a stamping-hammer, 142, which is similar in construction to the wad-hammers already described. Situated adjacent to the figured face of the stamping plunger is an inking-roller, 143, which is pivoted to the plate 51 by means of an arm, 144, one end of which extends beyond the edge of the plate 51 into the path of the posts or pillars 64, so that when one of the pillars passes the arm 144 it shall move the inking-roller 143, which is attached to the opposite free end of the rod 144 directly over the stamping-plunger opening 145 in the plate 51. As the post 64 engages with the arm 144, the inking-roller 143 passes over the opening 145 and directly under the face of the stamping-plunger 139, by means of which ink is deposited on the face of the plunger. After the arm 64 has passed the arm 144, the spiral spring 146 carries the roller 143 back again to its original position. The stamping-hammer 142 then descending, the loaded and crimped cartridge in its holder being directly below the stamping-plunger, the face of the stamping-plunger comes upon the wad in the shell and stamps the impression thereon. When the shell is being stamped, it rests over an opening in the bed-plate, which is filled by a disk, 147, (shown in Figs. 12 and 13,) which is attached to one end of the arm 148, which arm rests on a bracket, 149, secured to the bed-plate 3, the arm being held in position by the spiral spring 150.

On the end of the arm 148 is an elbow, 151, at the end of which is the friction-wheel 152, which extends down on the inside of the cam-wheel 44. On the side of this cam-wheel 44 is a cam, 153, which engages with the friction-wheel 152 and draws the elbow 151 back, so that the disk 147 is moved away from the opening in the bed-plate 3 to allow the discharge of the shell, which is accomplished by the force of the spring 154 on the stamping-hammer 142, which spring is compressed when the cross-bar 100 is in its lowered position. When the cam 153 has passed away from the friction-roller 152, the force of the spring 150 brings the disk 147 back to its former position.

As already described, the powder and shot hoppers remain closed when the machine is first started until the shells are brought beneath them. The wad-hopper is also provided with an arrangement for accomplishing the same purpose. Extending from the plate 51 or sleeve 80 is a bracket, 159, in which is a spring-arm, 160, which is shown in Fig. 26, having a lateral arm, 161, which extends below the level of the recess 81 directly under the lower mouth of the wad-hopper. Around the rod 160 is a spiral spring, 162, and above the arm 160 is a screw-bolt, 163, by means of which the arm 161 may be kept in its depressed position. When, however, it is desired to close the mouth of the wad-hopper, by turning the bolt 163 the force of the spring 162 carries the arm 161 up within the recess 81 against the lower mouth of the wad-hopper.

I claim—

1. In a cartridge-loader, the combination of a stationary bed-plate, a revoluble plate situated above the stationary plate and carrying one or more shell-holders, a shell-hopper, a shell-feeder situate below the plane of the shell-holders, and adjustable plates secured to the stationary bed-plate in the line of the movement of the shell-holders for accommodating different-lengthed shells, substantially as and for the purposes specified.

2. A wad-holder composed of two or more cylinders fitting one within the other and provided with slots sufficiently wide to admit of the passage of wads into the wad-holder laterally, the said cylinders being rotarily adjustable on a longitudinal axis to bring said slots into and out of register, substantially as and for the purpose described.

3. In a cartridge-loading machine, the combination of a stationary plate and a revoluble plate, a short shaft, 10, having a gear-wheel, 11, operated by the main shaft 4, a collar, 13, fast on the short shaft, two oppositely-radiating arms, 14 15, fast to said collar, and a flange, 16, depending from the revoluble plate and having ratchets 17 for the purpose of imparting an intermittent rotary motion to the revoluble plate, substantially as and for the purposes specified.

4. In a cartridge-loading machine, the combination of a stationary plate, a revoluble plate provided with depending ratchets 17, a driven shaft, 10, having arms 14 and 15 fixed thereto, the cams 20 and 21, also connected with and moved by said shaft, and a lock-rod, 22, operated by said cams to engage and disengage the revoluble plate, substantially as and for the purpose described.

5. In a cartridge-loading machine, an inclined shell-hopper, 29, provided on its lower surface with a series of ridges or grooves, 30, so as to raise the body of the shell above the bottom of the hopper sufficiently to prevent the rim on the head of the cartridge-shell from coming in contact therewith, substantially as and for the purposes described.

6. In a cartridge-loading machine, the combination of an inclined shell-hopper, a retaining shield or guard, 32, constructed of two or more superposed segmental sections of sheet metal adjustably connected by a slot and set-screw, and pivoted in the mouth of the shell-hopper, a shell-feeder having a pivoted leaf, the rotary cam acting upon said leaf, and a projection from the pivoted guard extended into the path of movement of the pivoted leaf, substantially as and for the purposes specified.

7. In a cartridge-loading machine, the combination of a shell-hopper, a retaining shield or guard, 32, vibrating arms 34, secured to said guard and pivoted to the hopper so as to locate the guard in the discharge end of the hopper, the shell-feeder having the pivoted leaf 39, and the bent rod 36, connecting the said pivoted leaf and guard, substantially as and for the purpose described.

8. In a cartridge-loading machine, the shell-feeder constructed of a cylindrical tube having a hinged leaf, 39, and an arm, 46, provided with the roller 45, combined with a rotary cam, 44, substantially as and for the purpose described.

9. In a cartridge-loading machine, the combination of a shell-hopper, a shell-feeder having a hinged leaf arranged to fall at the discharge end of the hopper, and a spring and a cam co-operating with the said leaf to direct the shell from the hopper into the feeder, and a plunger arranged in the feeder and connected with a retracting cam and a projecting spring, substantially as and for the purpose described.

10. In a cartridge-loading machine, the combination of a stationary bed-plate, an intermittently-revoluble plate, a series of shell-holders secured to the last-named plate, a shell-hopper and a vibrating shield or guard arranged in the discharge end of the hopper, a shell-feeder situated below the stationary bed-plate, and into which the shells are delivered from the hopper by the vibrating shield or guard, a spring-plunger for delivering the shells from the shell-feeder into the shell-holder, and a rotary cam for actuating the plunger, substantially as and for the purpose described.

11. In a cartridge-loading machine, the combination of a powder or shot canister mounted upon a stationary plate, a charger situated below the canister, a sliding plate for making and breaking connection between the canister and the charger, said plate having a cam on its outer edge, and a post or posts mounted on the revolving plate so as to operate the slides, substantially as and for the purposes described.

12. In a cartridge-loading machine, the combination of a stationary plate, 51, and a shot or powder canister having a charger connected to said plate, a cut-off in the upper end of such charger, and a slide, 60, arranged in the lower end of such charger and provided with a slot and thumb-screw, 61, to connect it movably to the plate 51, so as to cut off the lower mouth of the charger and close the same until the shell is brought into position for its charge of powder or shot, substantially as and for the purposes specified.

13. In a cartridge-loading machine, the combination of the stationary plate 51, having openings 56, shot or powder canister having a charger arranged beneath it, a spring-slide, 62, arranged in the bottom of the canister to admit a charge into the charger and then cut off the supply, and a revoluble plate, 8, having a series of shell-holders attached thereto, said holders being open at the top of the revoluble plate, substantially as and for the purposes described.

14. In a cartridge-loading machine, the combination of a stationary bed-plate, a type-holder, 72, arranged to rotate upon said plate, an inking-pad, 68, also arranged upon said plate to swing up against and ink the type in the type-holder, a rotary cam and connections between it and the type-holder and inking-pad, and a revoluble plate having a series of shell-holders provided with slots into which the type-holder is projected, substantially as and for the purpose described.

15. In a cartridge-loading machine, the combination of a stationary plate, a revoluble plate having a series of shell-holders and arranged above the stationary plate, a second non-rotating plate arranged above the revoluble plate, a wad-hopper and a wad-plunger on said non-rotating plate, a wad-slide arranged beneath the wad-hopper, and inclined arms 155, mounted upon the revoluble plate and acting upon the wad-slide, substantially as and for the purpose described.

16. In a cartridge-loading machine, the wad-slide 82, composed of two strips of metal removably united, combined with a slideway and an adjustable hopper, substantially as and for the purpose described.

17. In a cartridge-loading machine, the combination of a stationary plate, a revoluble plate having a series of shell-holders arranged above the stationary plate, a second non-rotating plate arranged above the revoluble plate, a wad-hopper and a wad-plunger on said non-rotating plate, a wad-slide arranged beneath the wad-hopper, and inclined arms 155, adjustably mounted upon the revoluble plate and acting upon the wad-slide, substantially as and for the purpose described.

18. In a cartridge-loading machine, the combination of a spring stamping-plunger, a vertically-reciprocating cross-head, a hammer attached with an intervening spring to said cross-head and arranged thereon in the plane of the plunger to act upon and depress it upon the descent of the cross-head, and an inking-roller to supply ink to the stamping device, substantially as and for the purpose described.

19. In a cartridge-loading machine, the stationary bed-plate 3, having an opening through which the shell is discharged after being stamped, the pivoted disk 147, arranged in said opening to support the disk while being stamped, and the cam 153 and spring 150, for operating the said disk, in combination with the stamping device secured above the bed-plate and comprising a plunger and the reciprocating cross-head having a hammer to descend upon the plunger to operate the stamping device, substantially as and for the purpose described.

20. In a cartridge-loading machine, the combination of a stationary plate having an aperture for the passage of the wad, an inserted plate, 87, which plate is provided with two or more openings of different sizes to accommodate different sizes of wads, and a locking-bolt, 88, substantially as and for the purpose specified.

21. In a cartridge-loading machine, the combination of a wad-hopper, a wad-slide, and the arm 160, arranged vertically in the wad-hopper base and provided with a spring normally elevating it, and a set-screw for depressing it at pleasure, and the arm 161, connected to and moving with the other arm to close and open the wad-hopper through the movements of said arm 160, substantially as and for the purpose described.

22. In a cartridge-loading machine, the combination of a rotating crimping-head, a plunger, 122, arranged beneath said head and carrying the shell to be crimped, a cam, 134, on the rotary shaft 4, the plunger-operating arm 129, pivoted to a stationary member of the machine and having the arm 131 engaging the cam, and an adjustable foot on said lever interposed between it and the plunger, substantially as and for the purpose described.

In testimony whereof I have hereunto set my hand this 26th day of November, A. D. 1887.

EDWARD A. FRANKLIN.

Witnesses:
W. B. CORWIN,
JNO. K. SMITH.